United States Patent
Wang et al.

(10) Patent No.: US 10,101,505 B2
(45) Date of Patent: Oct. 16, 2018

(54) DEVICE AND METHOD FOR GENERATING VORTEX BEAM GENERATION

(71) Applicant: HUAWEI TECHNOLOGIES CO., LTD., Shenzhen (CN)

(72) Inventors: Jian Wang, Wuhan (CN); Jing Du, Wuhan (CN); Jifang He, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 15/481,578

(22) Filed: Apr. 7, 2017

(65) Prior Publication Data

US 2017/0212282 A1     Jul. 27, 2017

Related U.S. Application Data

(63) Continuation of application No. PCT/CN2014/088293, filed on Oct. 10, 2014.

(51) Int. Cl.
*G02F 1/29*      (2006.01)
*G02B 5/00*      (2006.01)
*G02B 27/14*     (2006.01)

(52) U.S. Cl.
CPC ......... *G02B 5/008* (2013.01); *G02B 27/141* (2013.01)

(58) Field of Classification Search
CPC ............................ G02B 5/008; G02B 27/141
USPC ....................... 359/299, 301, 302
See application file for complete search history.

(56) References Cited

U.S. PATENT DOCUMENTS

2013/0208332 A1* 8/2013 Yu ..................... G02F 1/01
                                                    359/240
2013/0250389 A1     9/2013 Ghai et al.

FOREIGN PATENT DOCUMENTS

| CN | 201673690 U | 12/2010 |
| CN | 103792605 A | 5/2014 |
| CN | 103969738 A | 8/2014 |
| CN | 103984103 A | 8/2014 |
| WO | 2014/039487 A1 | 3/2014 |

OTHER PUBLICATIONS

International Search Report dated Jul. 17, 2015 in corresponding International Application No. PCT/CN2014/088293.
Extended European Search Report dated Sep. 12, 2017 in corresponding European Patent Application No. 14903563.6.
(Continued)

*Primary Examiner* — William Choi
(74) *Attorney, Agent, or Firm* — Staas & Halsey LLP

(57) ABSTRACT

A vortex beam device includes: a metal reflector, a low refractive index layer, and multiple elliptical dielectric elements. The low refractive index layer located on the metal reflector. The multiple elliptical dielectric elements are embedded in the low refractive index layer and arranged in an array, major axes of the multiple elliptical dielectric elements are parallel or coincident. The multiple elliptical dielectric elements have a same thickness. A thickness of the low refractive index layer is greater than a thickness of the elliptical dielectric element. An outer surface of each elliptical dielectric element is flush with an outer surface of the low refractive index layer. A refractive index of the low refractive index layer is less than a refractive index of the elliptical dielectric element.

10 Claims, 9 Drawing Sheets

(56) References Cited

OTHER PUBLICATIONS

Hui K et al.: "Dependence of anisotropic surface plasmon lifetimes of two-dimensional hole arrays on hole geometry," Applied Physics Letters, A I P Publishing LLC, US, vol. 95, No. 6, Aug. 13, 2009, pp. 63110-63110, XP012122664.
Li J et al.: "The plasmonic properties of elliptical metallic hole arrays," Applied Physics Letters, A I P Publishing LLC, US, vol. 94, No. 3, Jan. 21, 2009, pp. 33101-33101, XP012118680.
International Search Report dated Jul. 17, 2015 in corresponding International Patent Application No. PCT/CN2014/088293.
Yuanmu Yang et al. "Dielectric Meta-Reflectarray for Broadband Linear Polarization Conversion and Optical Vortex Generation" Nano letters, Feb. 18, 2014.

* cited by examiner

DEVICE AND METHOD FOR GENERATING VORTEX BEAM GENERATION

CROSS-REFERENCE TO RELATED APPLICATIONS

This application is a continuation of International Application No. PCT/CN2014/088293, filed on Oct. 10, 2014, the disclosure of which is hereby incorporated by reference in its entirety.

TECHNICAL FIELD

The present disclosure relates to the field of optical modulation technologies, and in particular, to method and device for generating a vortex beam.

BACKGROUND

In addition to carrying linear momentum, a beam further carries angular momentum. The angular momentum includes spin angular momentum (SAM) and orbital angular momentum (OAM). The SAM is usually related to spin of a photon, and such a relationship is embodied as circular polarization. A value of the SAM may be $\pm\hbar$. In contrast, the OAM is related to a spiral phase wave. In 1992, Allen et al. found a beam with an exp (il$\varphi$) spiral phase factor by means of experiments and researches. The OAM carried by each photon of the beam is l$\hbar$, the value is l times the SAM, and $\varphi$ is an azimuth.

In recent years, application of the OAM in the field of communications has attracted wide attention. Different from the SAM with only two values $\pm\hbar$, l$\hbar$ of the OAM may be any value within ($-\infty$, $+\infty$), and different OAMs can be easily distinguished. Therefore, a communication capacity and spectral efficiency can be greatly increased by performing communication based on the OAM. As a result, generation and detection technologies of a vortex beam with OAM have attracted increasing attention from people.

Research institutions from home and abroad have made extensive and careful researches on the field of vortex beam generation, and manners of generating a vortex beam vary. For example, the vortex beam is generated by using a V antenna array.

A V antenna in the V antenna array includes a metal V-shaped structure and a silicon substrate, and the metal V-shaped structure is grown on the silicon substrate. When incident light is emitted onto the metal V antenna, surface plasma oscillation is caused, and scattered light has a particular amplitude and phase. The amplitude and phase of the scattered light are related to an arm length and an included angle of the metal V antenna. By designing the arm length and the included angle of the V antenna, scattered light resulting from a Gaussian beam emitted onto the V antenna array may have the OAM, thereby generating a vortex beam.

A structure of a V antenna that can generate the vortex beam is relatively small. This is not conducive to production. In addition, because the V antenna is of a metal structure, the metal structure absorbs incident light, thereby resulting in a relatively large loss.

SUMMARY

An embodiment of the present invention provides a vortex beam generation device, where the device includes: a metal reflector, a low refractive index layer, and multiple elliptical dielectric elements, where the low refractive index layer located on the metal reflector, the multiple elliptical dielectric elements are embedded in the low refractive index layer, and arranged in an array, major axes of the multiple elliptical dielectric elements are parallel or coincident, and a minor axis and a major axis of each elliptical dielectric element are greater than 50 nm. The multiple elliptical dielectric elements have a same thickness. A thickness of the low refractive index layer is greater than the thickness of the elliptical dielectric element. An outer surface of each elliptical dielectric element is flush with an outer surface of the low refractive index layer. A refractive index of the low refractive index layer is less than a refractive index of the elliptical dielectric element.

Another embodiment of the present invention provides a vortex beam generation device production method, where the method includes:

growing a dielectric layer on a substrate; etching multiple elliptical patterns on the dielectric layer to obtain a plurality of elliptical dielectric elements, where an etching depth is equal to a thickness of the dielectric layer, the plurality of elliptical dielectric elements are arranged in an array, major axes of the multiple elliptical dielectric elements are parallel or coincident, and a minor axis and a major axis of each elliptical dielectric element are greater than 50 nm; growing a low refractive index layer on the dielectric layer after etching, the plurality of elliptical dielectric elements are covered by the low refractive index layer, a thickness of the low refractive index layer is greater than a thickness of the elliptical dielectric element, and a refractive index of the low refractive index layer is less than a refractive index of the elliptical dielectric element; and growing a metal reflector on the low refractive index layer.

A further embodiment of the present invention provides a vortex beam generation method. The method includes:

emitting a polarized beam perpendicularly onto a vortex beam generation device; and separating reflected light coming from the vortex beam generation device by using a polarization beam splitter or a polarization analyzer to obtain a vortex beam.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of embodiments of the present invention clearer, the following further describes the embodiments of the present invention in detail with reference to the accompanying drawings.

Embodiment 1

Figure 1:
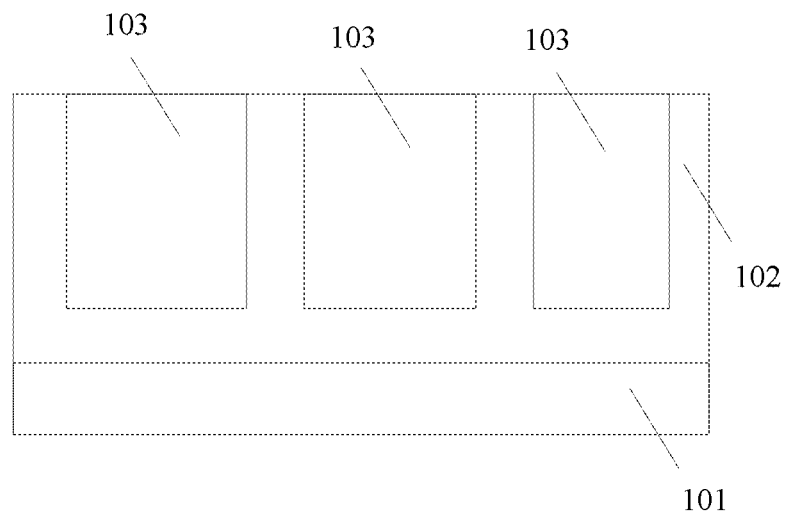
FIG. 1 is a schematic structural diagram of a vortex beam generation device according to Embodiment 1 of the present invention.
Figure 2:
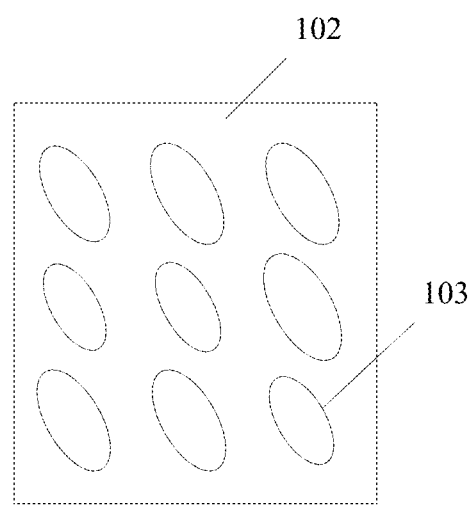
FIG. 2 is a schematic structural diagram of a vortex beam generation device according to Embodiment 1 of the present invention.

An embodiment of the present invention provides a vortex beam generation device. Referring to FIG. 1 and FIG. 2, the vortex beam generation device includes:

a metal reflector 101, a low refractive index layer 102, and multiple elliptical dielectric elements 103, where the metal reflector 101 is covered by the low refractive index layer 102, the multiple elliptical dielectric elements 103 are embedded in the low refractive index layer 102, the multiple elliptical dielectric elements 103 are arranged in an array, straight lines on which major axes of the multiple elliptical dielectric elements 103 are located are parallel or coincident, and a minor axis and a major axis of each elliptical dielectric element 103 are both greater than 50 nm.

The multiple elliptical dielectric elements 103 have a same thickness. A thickness of the low refractive index layer 102 is greater than the thickness of the elliptical dielectric element 103. An outer surface of each elliptical dielectric element 103 is flush with an outer surface of the low refractive index layer 102. The outer surface of the elliptical dielectric element 103 and the outer surface of the low refractive index layer 102 are both surfaces that are relatively distant from the metal reflector 101.

A refractive index of the low refractive index layer 102 is less than a refractive index of the elliptical dielectric element 103.

According to this embodiment of the present invention, a metal reflector is covered by a low refractive index layer and multiple elliptical dielectric elements. The multiple elliptical dielectric elements are arranged in an array. Straight lines on which major axes of the multiple elliptical dielectric elements are located are parallel or coincident, that is, directions of the multiple elliptical dielectric elements are the same. When incident light is emitted onto a vortex beam generation device, resonance of the elliptical dielectric elements is caused, so that an amplitude and a phase of reflected light are changed, that is, the amplitude and the phase of a part of the reflected light are modulated; and a polarization direction is perpendicular to that of the incident light, that is, an OAM beam is obtained. By using a dielectric material as elements of the array, less incident light is absorbed, and a loss is small. In addition, the vortex beam generation device provided in the present invention has a simple production process, and is easy to produce.

Embodiment 2

Figure 3:
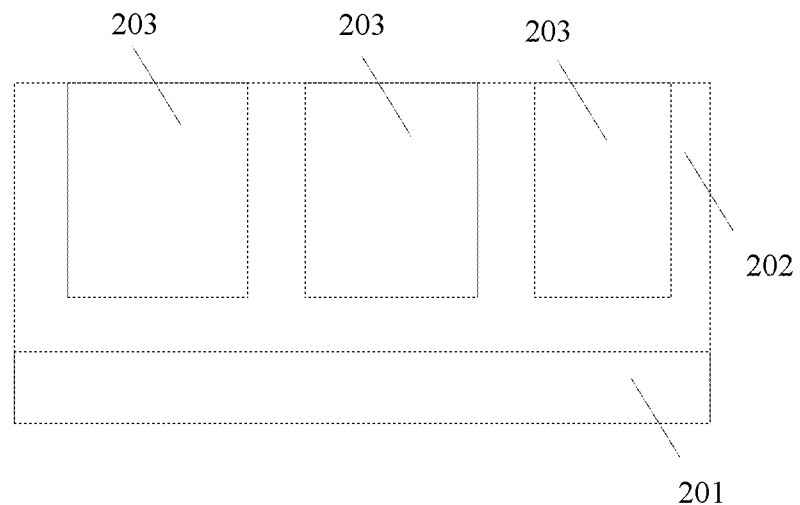
FIG. 3 is a schematic structural diagram of a vortex beam generation device according to Embodiment 2 of the present invention.
Figure 4:
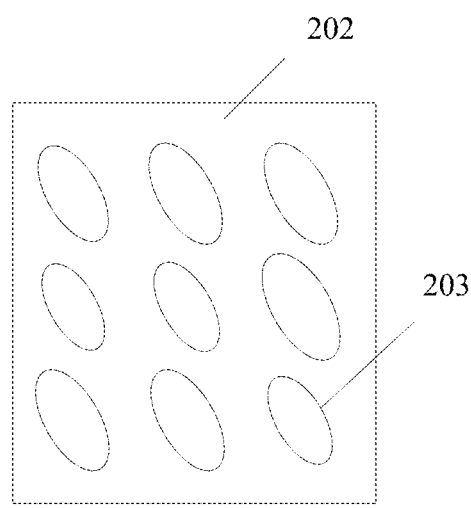
FIG. 4 is a schematic structural diagram of a vortex beam generation device according to Embodiment 2 of the present invention.

An embodiment of the present invention provides a vortex beam generation device. Referring to FIG. 3 and FIG. 4, the vortex beam generation device includes:

a metal reflector 201, a low refractive index layer 202, and multiple elliptical dielectric elements 203, where the metal reflector 201 is covered by the low refractive index layer 202, the multiple elliptical dielectric elements 203 are embedded in the low refractive index layer 202, the multiple elliptical dielectric elements 203 are arranged in an array, straight lines on which major axes of the multiple elliptical dielectric elements 203 are located are parallel or coincident, and a minor axis and a major axis of each elliptical dielectric element 203 are both greater than 50 nm.

The multiple elliptical dielectric elements 203 have a same thickness. A thickness of the low refractive index layer 202 is greater than the thickness of the elliptical dielectric element 203. An outer surface of each elliptical dielectric element 203 is flush with an outer surface of the low refractive index layer 202. The outer surface of the elliptical dielectric element 203 and the outer surface of the low refractive index layer 202 are both surfaces that are relatively distant from the metal reflector 201.

A refractive index of the low refractive index layer 202 is less than a refractive index of the elliptical dielectric element 203.

The refractive index of the low refractive index layer 202 is greater than or equal to 1, that is, the refractive index of the low refractive index layer 202 is not less than a refractive index of air.

The low refractive index layer 202 is a dielectric material layer.

Being arranged in an array means that distances between centers of each elliptical dielectric element 203 and adjacent elliptical dielectric elements 203 are equal. When the distances between the centers of each elliptical dielectric element 203 and the adjacent elliptical dielectric elements 203 are equal, it is ensured that the elliptical dielectric elements on the vortex beam generation device are uniformly distributed, so that a modulated vortex beam has equalized intensity.

In an implementation manner of this embodiment of the present invention, the metal reflector 201 may be a gold reflector, a silver reflector, or an aluminum reflector. The metal reflector 201 may also be a reflector made of another metal that can reflect incident light.

In an implementation manner of this embodiment of the present invention, the low refractive index layer 202 may be an organic macromolecular polymer, such as a polymethylmethacrylate (PMMA) layer or a $SiO_2$ layer. Certainly, the low refractive index layer 202 may also be another material whose refractive index is less than that of a dielectric layer.

In an implementation manner of this embodiment of the present invention, the elliptical dielectric element 203 may be a Si element or a $Si_3N_4$ element. The elliptical dielectric element 203 may also be another material whose refractive index is greater than that of the low refractive index layer. In this embodiment, the elliptical dielectric element is made of a dielectric material, so that the vortex beam generation device absorbs less incident light than metal (the metal causes resonance absorption of light), and therefore a light loss is small.

In an implementation manner of this embodiment of the present invention, a thickness of the metal reflector 201 is greater than or equal to 100 nm, the thickness of the low refractive index layer 202 is greater than or equal to 400 nm, and the thickness of the elliptical dielectric element 203 is greater than or equal to 300 nm. To facilitate production and manufacture, the thickness of the metal reflector 201 is between 100 nm and 1000 nm, the thickness of the low refractive index layer 202 is between 400 nm and 2000 nm, and the thickness of the elliptical dielectric element 203 is between 300 nm and 1000 nm.

In an implementation manner of this embodiment of the present invention, the array formed by the elliptical dielectric elements 203 has a minimum size of 10×10, so as to ensure that the incident light can be modulated to generate a vortex beam.

In an implementation manner of this embodiment of the present invention, the minor axis and the major axis of the elliptical dielectric element 203 are both greater than 50 nm. Because the elliptical dielectric element 203 has a relatively small size, and the vortex beam generation device has a high resolution, the vortex beam generated by the vortex beam generation device has a high resolution.

In an implementation manner of this embodiment of the present invention, a distance between centers of any two of the elliptical dielectric elements 203 is greater than or equal to 1 μm. To facilitate production and manufacture, the distance between the centers of any two of the elliptical dielectric elements is between 1 μm and 2 μm. It can be easily learned that the major axis of the elliptical dielectric element is shorter than the distance between the centers of two elliptical dielectric elements.

When the incident light is perpendicularly emitted onto the vortex beam generation device, modulated reflected light is perpendicularly reflected from a surface of the vortex beam generation device. To conveniently separate a vortex beam that is obtained by means of modulation from unmodulated reflected light, a polarization direction of the incident light can be adjusted, before modulation, to form an included angle with a straight line on which an elliptical major axis is located. In this way, when the incident light is modulated, the vortex beam that is obtained by means of modulation is orthogonal to the polarization direction of the incident light, and the unmodulated reflected light has a same polarization state as the incident light. Therefore, the vortex beam is orthogonal to a polarization direction of the unmodulated reflected light, and the vortex beam and the unmodulated reflected light are separated by using a device such as a polarization beam splitter or a polarization analyzer. Preferably, the included angle may be ±45 degrees. When the included angle is ±45 degrees, it is easy to separate the vortex beam from the unmodulated reflected light. In addition, because polarization components of the incident light along directions of straight lines on which the elliptical major axis and minor axis are located are the same, the reflected light is modulated to a same extent by the elliptical dielectric elements in the vortex beam generation device in terms of the two polarization components. Further, in this case, the reflected light can be modulated to a maximum extent, that is, the vortex beam that is obtained by means of modulation has a large phase range.

A modulation process of the vortex beam generation device for the incident light is specifically as follows: When linearly polarized incident light is emitted onto the elliptical dielectric elements, resonance of the elliptical dielectric elements is caused, and therefore, an amplitude and a phase of reflected light are changed.

Figure 5:
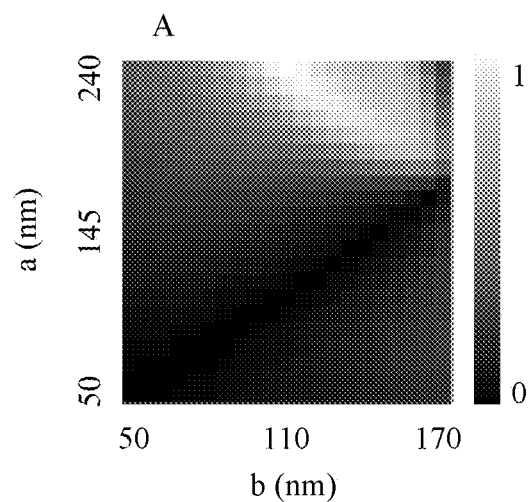
FIG. 5 is a diagram illustrating a relationship between a major axis size and a minor axis size of a vortex beam generation device and an amplitude of a vortex beam according to Embodiment 2 of the present invention.
Figure 6:
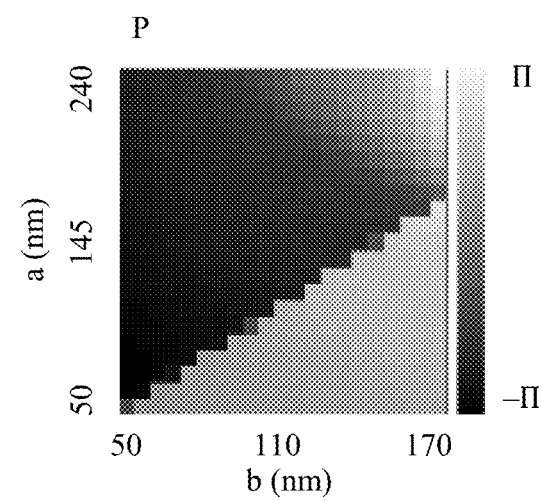
FIG. 6 is a diagram illustrating a relationship between a major axis size and a minor axis size of a vortex beam generation device and a phase of a vortex beam according to Embodiment 2 of the present invention.
Figure 7:
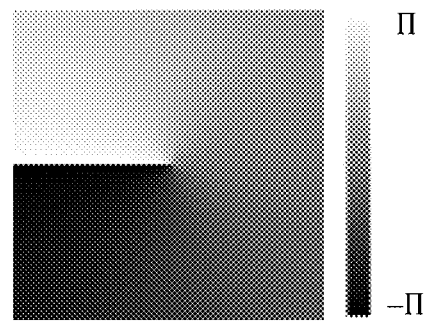
FIG. 7 is a phase distribution diagram of a first-order vortex beam according to Embodiment 2 of the present invention.
Figure 8:
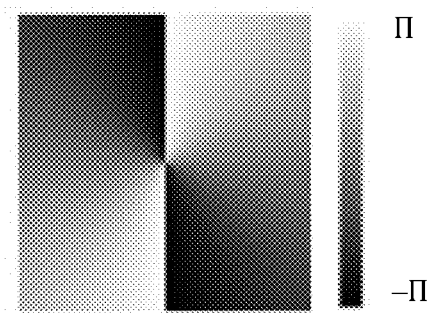
FIG. 8 is a phase distribution diagram of a second-order vortex beam according to Embodiment 2 of the present invention.
Figure 9:
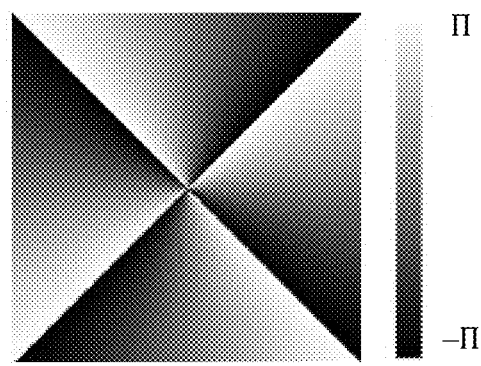
FIG. 9 is a phase distribution diagram of a fourth-order vortex beam according to Embodiment 2 of the present invention.
Figure 10:
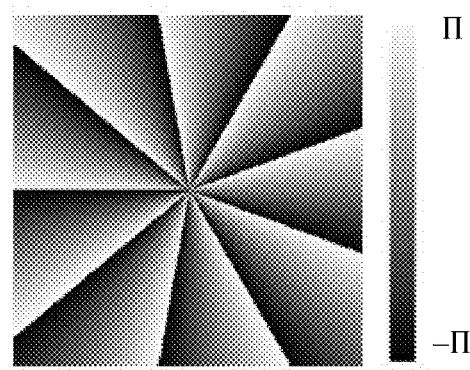
FIG. 10 is a phase distribution diagram of a ninth-order vortex beam according to Embodiment 2 of the present invention.

Certainly, the included angle between the polarization direction of the incident light and the major axis of the elliptical dielectric element has a limited impact on the phase range of the vortex beam, and a phase of the vortex beam that is obtained by means of modulation is mainly related to sizes of major and minor axes of the elliptical dielectric element. FIG. 5 and FIG. 6 show a relationship between a major axis size a and a minor axis size b of the elliptical dielectric element and a phase (P) and a relationship between the major axis size a and the minor axis size b and an amplitude (A), and the relationships can be obtained by means of simulation. During actual manufacture of the vortex beam generation device, a size of each elliptical dielectric element (sizes of the major and minor axes) is determined according to a vortex beam phase distribution diagram, that is, the size of each elliptical dielectric element corresponds to a phase of a point at a corresponding position in a phase distribution diagram of a to-be-generated vortex beam. Specifically, the size of each elliptical dielectric element can be determined according to the vortex beam phase distribution diagram in the following manner: The phase distribution diagram is determined according to an order of the vortex beam, for example, FIG. 7 to FIG. 10 are phase distribution diagrams of a first-order, a second-order, a fourth-order, and a ninth-order vortex beam respectively; points are determined correspondingly on the phase distribution diagram according to the array of the elliptical dielectric elements, for example, when the array on the vortex beam generation device is 10×10, points on the vortex beam phase distribution diagram are determined according to the array 10×10; and then, values of a and b corresponding to a phase of each point are separately found, so as to obtain the major axis size a and the minor axis size b of each elliptical dielectric element in the array on the vortex beam generation device. During selection of the major axis size a and the minor axis size b of the elliptical dielectric element, one phase value may correspond to multiple values of a or b. In this case, the values of a and b that can ensure consistency of the amplitude of the vortex beam are selected among the multiple values. The order of the vortex beam corresponds to the phase, and a phase of an L-th-order vortex beam is 2Lπ.

In addition, in this embodiment, directions of major axes of the elliptical dielectric elements are the same, so that it can be ensured that the included angle between the polarization direction of the incident light and the major axis of each elliptical dielectric element is fixed, the incident light is modulated to a same extent by each elliptical dielectric element, and therefore, it is ensured that the device that is designed according to the a and b values selected according to the vortex beam phase distribution diagram can generate the vortex beam.

In addition, conversion rates of converting Gaussian beams (incident light) of different wavelengths to vortex beams are different. When the wavelength of the Gaussian beam varies from 1500 nm to 1600 nm, the conversion rate of the Gaussian beam to the vortex beam is greater than 60%. Especially when the thickness of the low refractive index layer 202 is 150 nm and when the wavelength of the Gaussian beam is approximate to 1550 nm, the conversion rate of the Gaussian beam to an OAM beam can reach 90%.

Further, the vortex beam generation device further includes a silica substrate with which the outer surfaces of the multiple elliptical dielectric elements 203 are covered, and the silica substrate can protect the device.

According to this embodiment of the present invention, a metal reflector is covered by a low refractive index layer and multiple elliptical dielectric elements. The multiple elliptical dielectric elements are arranged in an array. Straight lines on which major axes of the multiple elliptical dielectric elements are located are parallel or coincident, that is, directions of the multiple elliptical dielectric elements are the same. When incident light is emitted onto a vortex beam generation device, resonance of the elliptical dielectric elements is caused, so that an amplitude and a phase of reflected light are changed, that is, the amplitude and the phase of a part of the reflected light are modulated; and a polarization direction is perpendicular to that of the incident light, that is, an OAM beam is obtained. By using a dielectric material as elements of the array, less incident light is absorbed, and a loss is small. The elliptical dielectric element has a small size and a high resolution. Due to existence of the low refractive index layer, the low refractive index layer is equivalent to a propagation distance added between the elliptical dielectric elements and the metal reflector. When the incident light is emitted onto the elliptical dielectric elements for the first time, a part of the incident light is reflected, and a part of the incident light is transmitted. The transmitted light can be reflected back and forth through the low refractive index layer. When the light is reflected back and forth through the low refractive index layer, a possibility that the light is modulated by the elliptical dielectric elements is increased, that is, a conversion rate of converting the incident light to modulated light is increased, and as a result, the vortex beam generation device has a higher vortex beam conversion rate. The vortex beam generation device has a relatively low requirement for the wavelength of the incident light, so that an applicable wavelength range is expanded. In addition, the vortex beam generation device provided in the present invention has a simple production process, and is easy to produce.

Embodiment 3

Figure 11:
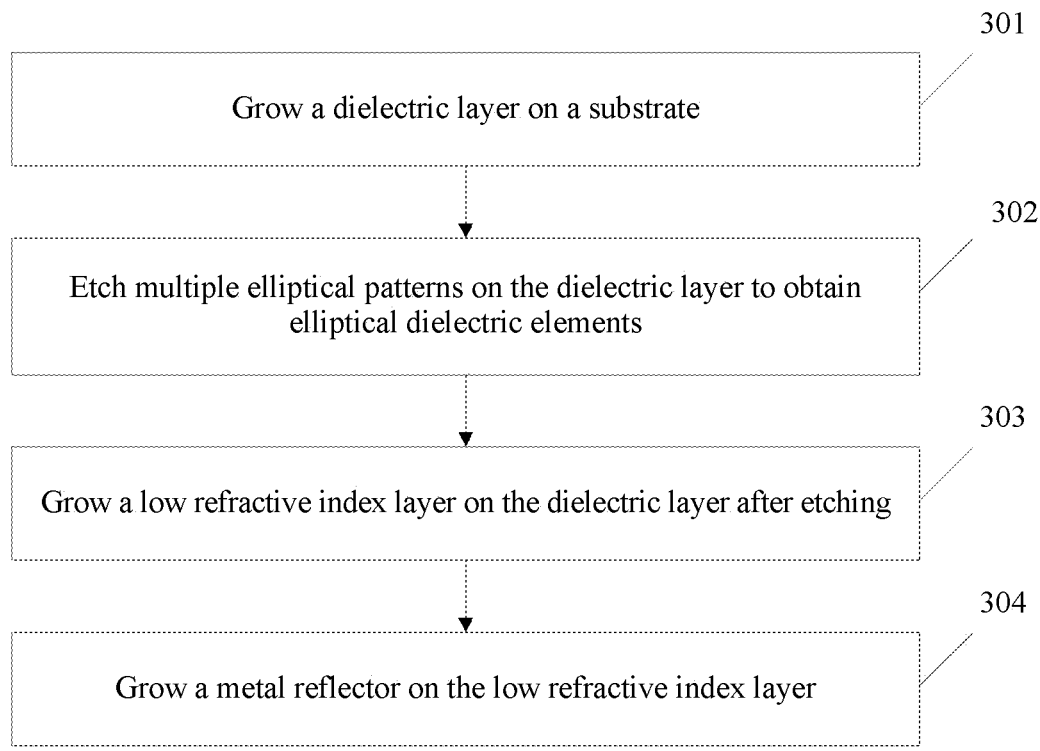
FIG. 11 is a flowchart of a vortex beam generation device production method according to Embodiment 3 of the present invention.

An embodiment of the present invention provides a vortex beam generation device production method. Referring to FIG. 11, the method includes:

Step 301: Grow a dielectric layer on a substrate.

Step 302: Etch multiple elliptical patterns on the dielectric layer to obtain elliptical dielectric elements, where an etching depth is equal to a thickness of the dielectric layer, the multiple elliptical dielectric elements are arranged in an array, straight lines on which major axes of the multiple elliptical dielectric elements are located are parallel or coincident, and a minor axis and a major axis of each elliptical dielectric element are both greater than 50 nm.

Step 303: Grow a low refractive index layer on the dielectric layer after etching, where gaps between the elliptical dielectric elements are filled with the low refractive index layer, the elliptical dielectric elements are covered by the low refractive index layer, a thickness of the low refractive index layer is greater than a thickness of the elliptical dielectric element, and a refractive index of the low refractive index layer is less than a refractive index of the elliptical dielectric element.

Step 304: Grow a metal reflector on the low refractive index layer.

According to this embodiment of the present invention, a metal reflector is covered by a low refractive index layer and multiple elliptical dielectric elements. The multiple elliptical dielectric elements are arranged in an array. Straight lines on which major axes of the multiple elliptical dielectric elements are located are parallel or coincident, that is, directions of the multiple elliptical dielectric elements are the same. When incident light is emitted onto a vortex beam generation device, resonance of the elliptical dielectric elements is caused, so that an amplitude and a phase of reflected light are changed, that is, the amplitude and the phase of a part of the reflected light are modulated; and a polarization direction is perpendicular to that of the incident light, that is, an OAM beam is obtained. By using a dielectric material as elements of the array, less incident light is absorbed, and a loss is small. In addition, the vortex beam generation device provided in the present invention has a simple production process, and is easy to produce.

Embodiment 4

Figure 12:
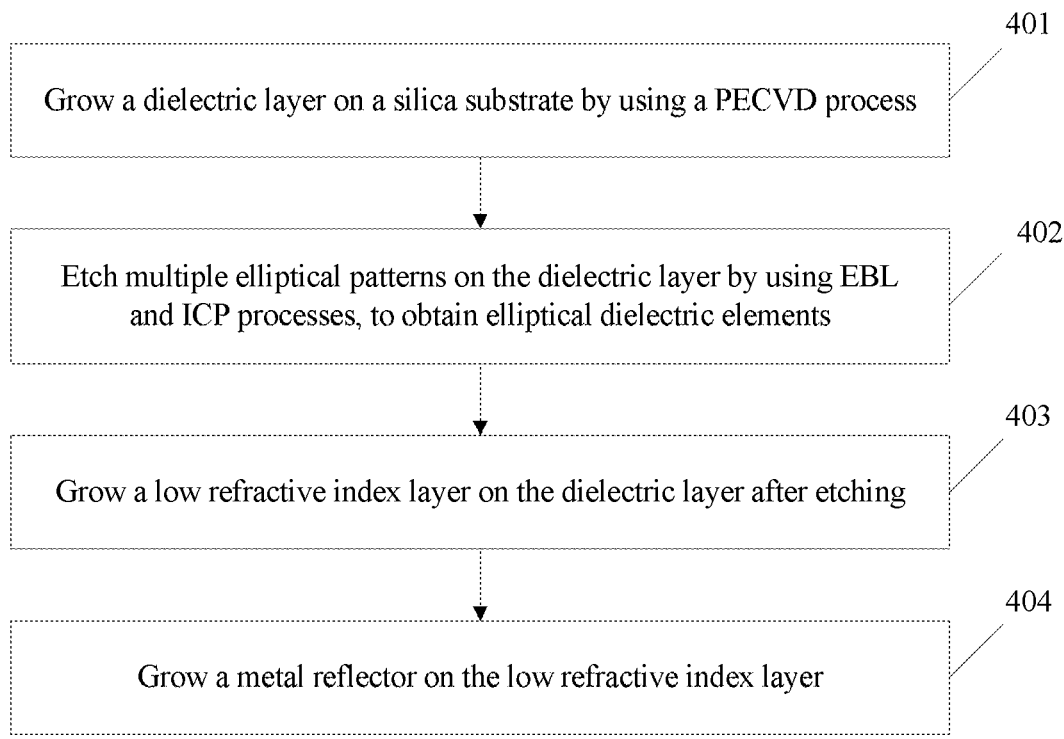
FIG. 12 is a flowchart of a vortex beam generation device production method according to Embodiment 4 of the present invention.

An embodiment of the present invention provides a vortex beam generation device production method. Referring to FIG. 12, the method includes the following steps.

Step 401: Grow a dielectric layer on a silica substrate by using a plasma enhanced chemical vapor deposition (PECVD) process.

Figure 13:
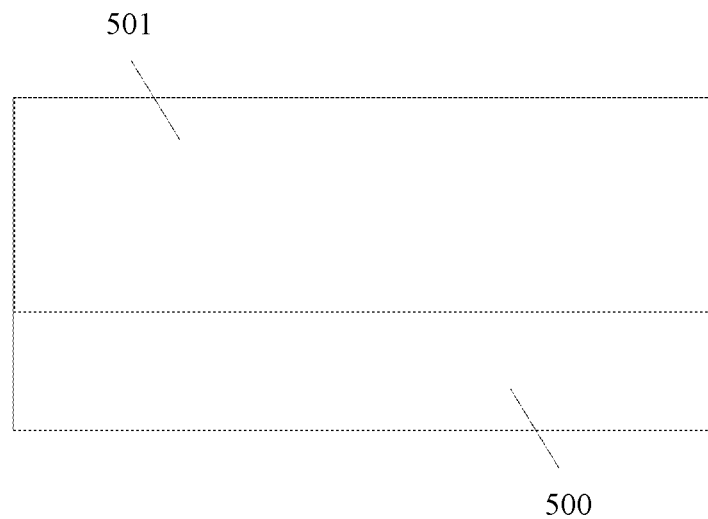
FIG. 13 is a schematic structural diagram of a vortex beam generation device with a grown dielectric layer according to Embodiment 4 of the present invention.

As shown in FIG. 13, the dielectric layer 501 is grown on the silica substrate 500. In another embodiment, the substrate may also be another material, but a refractive index of the substrate must be less than a refractive index of the dielectric layer.

The dielectric layer may be a Si layer or a $Si_3N_4$ layer. The dielectric layer may also be another material whose refractive index is greater than that of the low refractive index layer.

In this embodiment, a thickness of elliptical dielectric elements is greater than or equal to 300 nm. To facilitate production and manufacture, the thickness of the elliptical dielectric element is between 300 nm and 1000 nm. Preferably, a thickness of the dielectric layer is 400 nm.

Step 402: Etch multiple elliptical patterns on the dielectric layer by using electron beam lithography (EBL) and inductive coupled plasma (ICP) processes, to obtain elliptical dielectric elements, where an etching depth is equal to a thickness of the dielectric layer, the multiple elliptical dielectric elements are arranged in an array, straight lines on which major axes of the multiple elliptical dielectric elements are located are parallel or coincident, and a minor axis and a major axis of each elliptical dielectric element are both greater than 50 nm.

Figure 14:
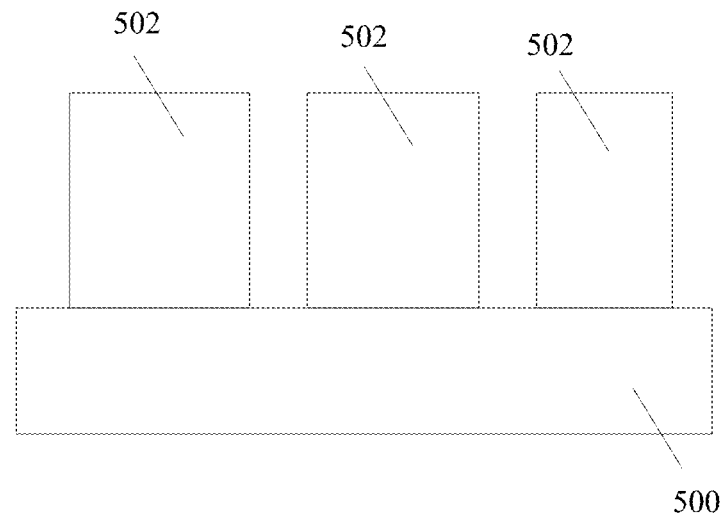
FIG. 14 is a schematic structural diagram of a vortex beam generation device after etching according to Embodiment 4 of the present invention.

As shown in FIG. 14, the multiple elliptical dielectric elements 502 are obtained after the dielectric layer 501 is etched.

Being arranged in an array means that distances between centers of each elliptical dielectric element and adjacent elliptical dielectric elements are equal. When the distances between the centers of each elliptical dielectric element and the adjacent elliptical dielectric elements are equal, it is ensured that the elliptical dielectric elements on the vortex beam generation device are uniformly distributed, so that a modulated vortex beam has equalized intensity.

In an implementation manner of this embodiment of the present invention, the array formed by the elliptical dielectric elements has a minimum size of 10×10, so as to ensure that incident light can be modulated to generate a vortex beam.

Step 403: Grow a low refractive index layer on the dielectric layer after etching, where gaps between the elliptical dielectric elements are filled with the low refractive index layer, the elliptical dielectric elements are covered by the low refractive index layer, a thickness of the low refractive index layer is greater than a thickness of the elliptical dielectric element, and a refractive index of the low refractive index layer is less than a refractive index of the elliptical dielectric element.

Figure 15:
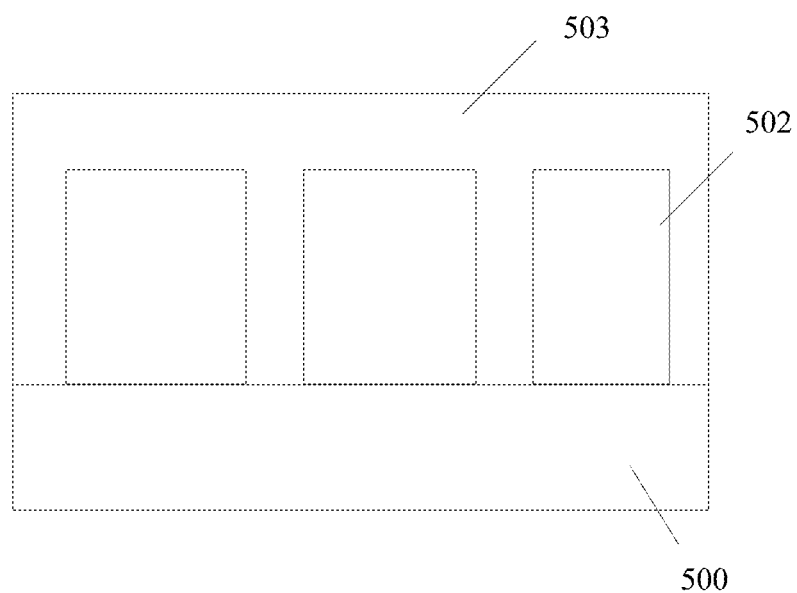
FIG. 15 is a schematic structural diagram of a vortex beam generation device with a grown low refractive index layer according to Embodiment 4 of the present invention.

As shown in FIG. 15, the low refractive index layer 503 is grown (for example, by means of spin coating) on the elliptical dielectric elements 502 after etching. The multiple elliptical dielectric elements 502 are covered by the low refractive index layer 503, and the gaps between the multiple elliptical dielectric elements 502 are filled with the low refractive index layer 503.

The refractive index of the low refractive index layer is greater than or equal to 1, that is, the refractive index of the low refractive index layer is not less than a refractive index of air.

The low refractive index layer is a dielectric material layer.

The low refractive index layer may be an organic macromolecular polymer, such as a PMMA layer or a $SiO_2$ layer. Certainly, the low refractive index layer may also be another material whose refractive index is less than that of the dielectric layer.

In this embodiment, the thickness of the low refractive index layer is greater than or equal to 400 nm. To facilitate production and manufacture, the thickness of the low refractive index layer is between 400 nm and 2000 nm. Preferably, the thickness of the low refractive index layer is 550 nm.

Step 404: Grow a metal reflector on the low refractive index layer.

Figure 16:
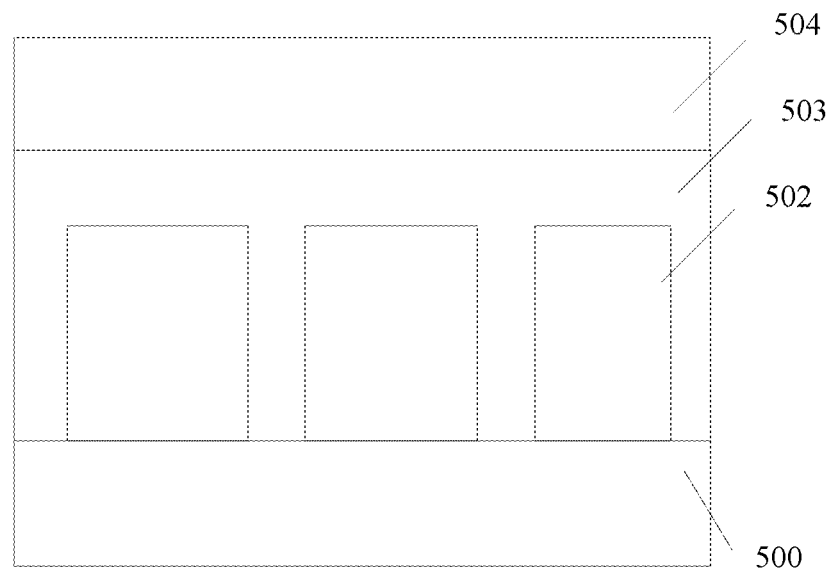
FIG. 16 is a schematic structural diagram of a vortex beam generation device with a grown metal reflector according to Embodiment 4 of the present invention.

As shown in FIG. 16, the metal reflector 504 is grown on a surface of the low refractive index layer 503.

The metal reflector may be a gold reflector, a silver reflector, or an aluminum reflector. The metal reflector may also be another metal that can reflect the incident light.

In this embodiment, a thickness of the metal reflector is greater than or equal to 100 nm. To facilitate production and manufacture, the thickness of the metal reflector is between 100 nm and 1000 nm. Preferably, the thickness of the metal reflector is 100 nm.

In this embodiment, the minor axis and the major axis of the elliptical dielectric element are both greater than 50 nm. Because the elliptical dielectric element has a relatively small size, and the vortex beam generation device has a high resolution, the vortex beam generated by the vortex beam generation device has a high resolution. A distance between centers of any two of the elliptical dielectric elements is greater than or equal to 1 µm. To facilitate production and manufacture, the distance between the centers of any two of the elliptical dielectric elements is between 1 µm and 2 µm. It can be easily learned that the major axis of the elliptical dielectric element is shorter than the distance between the centers of two elliptical dielectric elements.

A size of the entire vortex beam generation device is related to a quantity of used element structures, for example, when a quantity of silicon elliptical dielectric elements is m×n, the size of the entire vortex beam generation device is at least m×n µm².

When the incident light is perpendicularly emitted onto the vortex beam generation device, modulated reflected light is perpendicularly reflected from a surface of the vortex beam generation device. To conveniently separate a vortex beam that is obtained by means of modulation from unmodulated reflected light, a polarization direction of the incident light can be adjusted, before modulation, to form an included angle with a straight line on which an elliptical major axis is located. In this way, when the incident light is modulated, the vortex beam that is obtained by means of modulation is orthogonal to the polarization direction of the incident light, and the unmodulated reflected light has a same polarization state as the incident light. Therefore, the vortex beam is orthogonal to a polarization direction of the unmodulated reflected light, and the vortex beam and the unmodulated reflected light are separated by using a device such as a polarization beam splitter or a polarization analyzer. Preferably, the included angle may be ±45 degrees. When the included angle is ±45 degrees, it is easy to separate the vortex beam from the unmodulated reflected light. In addition, because polarization components of the incident light along directions of straight lines on which the elliptical major axis and minor axis are located are the same, the reflected light is modulated to a same extent by the elliptical dielectric elements in the vortex beam generation device in terms of the two polarization components. Further, in this case, the reflected light can be modulated to a maximum extent, that is, the vortex beam that is obtained by means of modulation has a large phase range.

A modulation process of the vortex beam generation device for the incident light is specifically as follows: When linearly polarized incident light is emitted onto the elliptical dielectric elements, resonance of the elliptical dielectric elements is caused, and therefore, an amplitude and a phase of reflected light are changed.

Certainly, the included angle between the polarization direction of the incident light and the major axis of the elliptical dielectric element has a limited impact on the phase range of the vortex beam, and a phase of the vortex beam that is obtained by means of modulation is mainly related to sizes of major and minor axes of the elliptical dielectric element, as shown in FIG. 5 and FIG. 6. During actual manufacture of the vortex beam generation device, a size of each elliptical dielectric element (sizes of the major and minor axes) is determined according to a vortex beam phase distribution diagram, that is, the size of each elliptical dielectric element corresponds to a phase of a point at a corresponding position in a phase distribution diagram of a to-be-generated vortex beam. Specifically, the size of each elliptical dielectric element can be determined according to the vortex beam phase distribution diagram in the following manner: The phase distribution diagram is determined according to an order of the vortex beam; points are determined correspondingly on the phase distribution diagram according to the array of the elliptical dielectric elements, for example, when the array on the vortex beam generation device is 10×10, points on the vortex beam phase distribution diagram are determined according to the array 10×10; and then, values of a and b corresponding to a phase of each point are separately found, so as to obtain the major axis size a and the minor axis size b of each elliptical dielectric element in the array on the vortex beam generation device. During selection of the major axis size a and the minor axis size b of the elliptical dielectric element, one phase value may correspond to multiple values of a or b. In this case, the values of a and b that can ensure consistency of the amplitude of the vortex beam are selected among the multiple values. The order of the vortex beam corresponds to the phase, and a phase of an L-th-order vortex beam is $2L\pi$.

In addition, in this embodiment, directions of major axes of the elliptical dielectric elements are the same, so that it can be ensured that the included angle between the polarization direction of the incident light and the major axis of each elliptical dielectric element is fixed, the incident light is modulated to a same extent by each elliptical dielectric element, and therefore, it is ensured that the device that is designed according to the a and b values selected according to the vortex beam phase distribution diagram can generate the vortex beam.

In addition, conversion rates of converting Gaussian beams (incident light) of different wavelengths to vortex beams are different. When the wavelength of the Gaussian beam varies from 1500 nm to 1600 nm, the conversion rate of the Gaussian beam to the vortex beam is greater than 60%. Especially when the thickness of the low refractive index layer is 150 nm and when the wavelength of the Gaussian beam is approximate to 1550 nm, the conversion rate of the Gaussian beam to an OAM beam can reach 90%.

According to this embodiment of the present invention, a metal reflector is covered by a low refractive index layer and multiple elliptical dielectric elements. The multiple elliptical dielectric elements are arranged in an array. Straight lines on which major axes of the multiple elliptical dielectric elements are located are parallel or coincident, that is, directions of the multiple elliptical dielectric elements are the same. When incident light is emitted onto a vortex beam generation device, due to interaction between the elliptical dielectric elements and a beam, an amplitude and a phase of a part of the reflected light are modulated, and a polarization direction is perpendicular to that of the incident light, that is, an OAM beam is obtained. By using a dielectric material as elements of the array, less incident light is absorbed, and a loss is small. The elliptical dielectric element has a small size and a high resolution. Due to existence of the low refractive index layer, the low refractive index layer is equivalent to a propagation distance added between the elliptical dielectric elements and the metal reflector. When the incident light is emitted onto the elliptical dielectric elements for the first time, a part of the incident light is reflected, and a part of the incident light is transmitted. The transmitted light can be reflected back and forth through the low refractive index layer. When the light is reflected back and forth through the low refractive index layer, a possibility that the light is modulated by the elliptical dielectric elements is increased, that is, a conversion rate of converting the incident light to modulated light is increased, and as a result, the vortex beam generation device has a higher vortex beam conversion rate. The vortex beam generation device has a relatively low requirement for the wavelength of the incident light, so that an applicable wavelength range is expanded. In addition, the vortex beam generation device provided in the present invention has a simple production process, and is easy to produce.

Embodiment 5

Figure 17:
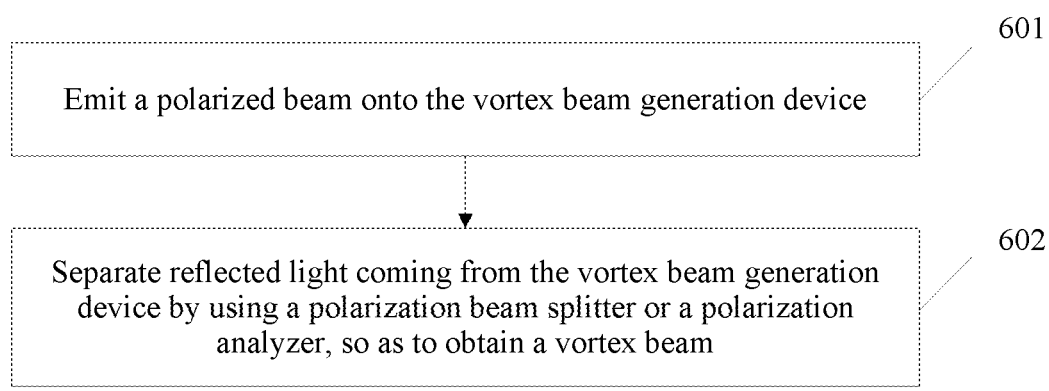
FIG. 17 is a flowchart of a vortex beam generation method according to Embodiment 5 of the present invention.

This embodiment provides a vortex beam generation method. The method is implemented by using the vortex beam generation device according to Embodiment 1 or 2. Referring to FIG. 17, the method includes the following steps.

Step 601: Emit a polarized beam perpendicularly onto the vortex beam generation device.

A polarization direction of a Gaussian beam is adjusted to form a fixed angle with a straight line on which a major axis of an elliptical dielectric element is located, so as to obtain the polarized beam. Preferably, the fixed angle may be ±45 degrees, and when the included angle is ±45 degrees, it is easy to separate the vortex beam from unmodulated reflected light. In addition, because polarization components of incident light along directions of straight lines on which the elliptical major axis and minor axis are located are the same, the reflected light is modulated to a same extent by the elliptical dielectric elements in the vortex beam generation device in terms of the two polarization components. Further, in this case, the reflected light can be modulated to a maximum extent, that is, the vortex beam that is obtained by means of modulation has a large phase range.

Step 602: Separate reflected light coming from the vortex beam generation device by using a polarization beam splitter or a polarization analyzer, so as to obtain a vortex beam.

Figure 18:
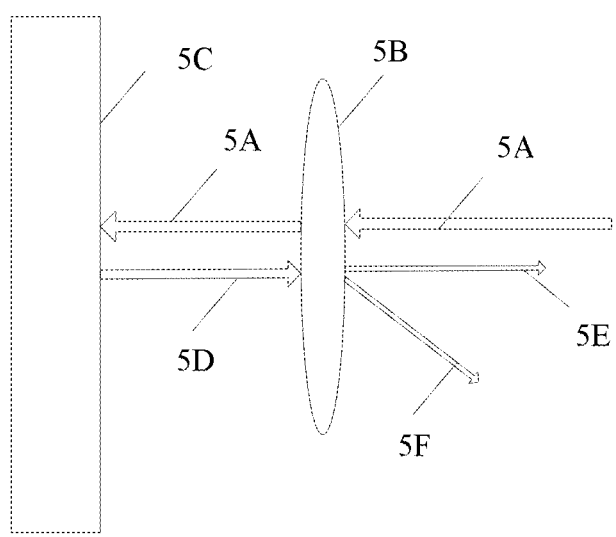
FIG. 18 is a schematic diagram of an optical path according to Embodiment 5 of the present invention.

The polarization beam splitter or the polarization analyzer is disposed on an optical path of the incident light. The incident light passes through the polarization beam splitter or the polarization analyzer, and is perpendicularly emitted onto the vortex beam generation device. The reflected light is obtained by modulating the incident light by using the vortex beam generation device. The reflected light includes unmodulated reflected light and a modulated vortex beam. The polarization beam splitter or the polarization analyzer separates the vortex beam in the reflected light, and changes a propagation direction of the vortex beam. As shown in FIG. 18, the incident light 5A passes through the polarization beam splitter or polarization analyzer 5B, and is emitted onto the vortex beam generation device 5C to generate the reflected light 5D. When the reflected light 5D passes through the polarization beam splitter or polarization analyzer 5B, a direction of the unmodulated reflected light 5E is unchanged, and the direction of the modulated vortex beam 5F is changed, that is, the modulated vortex beam 5F is separated.

In this embodiment, when incident light is perpendicularly emitted onto a vortex beam generation device, modulated reflected light is perpendicularly reflected from a surface of the vortex beam generation device. When an included angle between a polarization direction of the incident light and a straight line on which an elliptical major axis is located is ±45 degrees, polarization components of the incident light along directions of straight lines on which elliptical major and minor axes are located are the same. Therefore, the two polarization components are modulated to a same extent by the vortex beam generation device, and reflected light can be modulated to a maximum extent. When the incident light is emitted onto the vortex beam generation device, modulated reflected light is orthogonal to the polarization direction of the incident light, but unmodulated reflected light has a same polarization state as the incident light, thereby facilitating separation of the modulated reflected light from the unmodulated reflected light.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A vortex beam generation device, comprising:
a metal reflector, a low refractive index layer and multiple elliptical dielectric elements,
wherein the low refractive index layer located on the metal reflector, the multiple elliptical dielectric elements are embedded in the low refractive index layer and arranged in an array, major axes of the multiple elliptical dielectric elements are parallel or coincident, and a minor axis and a major axis of each elliptical dielectric element are greater than 50 nm;
wherein the multiple elliptical dielectric elements have a same thickness, a thickness of the low refractive index layer is greater than the thickness of the elliptical dielectric element, an outer surface of each elliptical dielectric element is flush with an outer surface of the low refractive index layer; and
wherein a refractive index of the low refractive index layer is less than a refractive index of the elliptical dielectric element.

2. The vortex beam generation device according to claim 1, wherein the metal reflector is a gold reflector, a silver reflector or an aluminum reflector, the low refractive index layer is a polymethylmethacrylate layer or a SiO$_2$ layer, and the elliptical dielectric element is a Si element or a Si$_3$N$_4$ element.

3. The vortex beam generation device according to claim 1, wherein a thickness of the metal reflector is greater than or equal to 100 nm, the thickness of the low refractive index layer is greater than or equal to 400 nm, and the thickness of the elliptical dielectric element is greater than or equal to 300 nm.

4. The vortex beam generation device according to claim 1, wherein a distance between centers of any two of the elliptical dielectric elements is greater than or equal to 1 µm.

5. The vortex beam generation device according to claim 1, wherein the array formed by the elliptical dielectric elements has a size of 10×10.

6. A production method for manufacturing a vortex beam generation device, comprising:
growing a dielectric layer on a substrate;
etching multiple elliptical patterns on the dielectric layer to obtain a plurality of elliptical dielectric elements, wherein an etching depth is equal to a thickness of the dielectric layer, the plurality of elliptical dielectric elements are arranged in an array, major axes of the multiple elliptical dielectric elements are parallel or coincident, and a minor axis and a major axis of each elliptical dielectric element are greater than 50 nm;
growing a low refractive index layer on the dielectric layer after etching, the plurality of elliptical dielectric elements are covered by the low refractive index layer, a thickness of the low refractive index layer is greater than a thickness of the elliptical dielectric element, and a refractive index of the low refractive index layer is less than a refractive index of the elliptical dielectric element; and
growing a metal reflector on the low refractive index layer.

7. The method according to claim 6, wherein the metal reflector is a gold reflector, a silver reflector, or an aluminum reflector, the low refractive index layer is a polymethylmethacrylate layer or a SiO$_2$ layer, and the elliptical dielectric element is a Si element or a Si$_3$N$_4$ element.

8. The method according to claim 6, wherein a thickness of the metal reflector is greater than or equal to 100 nm, the thickness of the low refractive index layer is greater than or equal to 400 nm, and the thickness of the elliptical dielectric element is greater than or equal to 300 nm.

9. The method according to claim 6, wherein a distance between centers of any two of the elliptical dielectric elements is greater than or equal to 1 µm.

10. A vortex beam generation method, comprising:
emitting a polarized beam perpendicularly onto a vortex beam generation device; and
separating reflected light coming from the vortex beam generation device by using a polarization beam splitter or a polarization analyzer to obtain a vortex beam.

* * * * *